United States Patent [19]

Saddy et al.

[11] Patent Number: 6,149,425
[45] Date of Patent: Nov. 21, 2000

[54] STATIC FURNACE FOR THE THERMAL DECOMPOSITION OF SOLIDS AT HIGH TEMPERATURES BY THERMAL RADIATION

[75] Inventors: Maury Saddy, Rio de Janeiro; Carlos Alberto Gusmão, Niteroi, both of Brazil

[73] Assignee: Liquid Carbonic Industrias S.A., Rio de Janeiro, Brazil

[21] Appl. No.: 08/793,908
[22] PCT Filed: Jun. 28, 1995
[86] PCT No.: PCT/BR95/00033
§ 371 Date: Feb. 27, 1997
§ 102(e) Date: Feb. 27, 1997
[87] PCT Pub. No.: WO97/01615
PCT Pub. Date: Jan. 16, 1997

[51] Int. Cl.[7] .................................................. F27D 15/02
[52] U.S. Cl. .......................... 432/77; 432/101; 432/202; 110/256
[58] Field of Search .................................. 432/77, 78, 96, 432/101, 102, 202, 173; 110/243, 251, 256, 245; 122/4 D

[56] References Cited

U.S. PATENT DOCUMENTS

| | | | |
|---|---|---|---|
| 3,625,497 | 12/1971 | Fritsch | 432/5 |
| 3,774,555 | 11/1973 | Turner | 110/210 |
| 4,502,920 | 3/1985 | Edwards . | |
| 4,572,082 | 2/1986 | Ueda et al. | 110/256 |
| 4,646,637 | 3/1987 | Cloots | 110/245 |
| 4,688,495 | 8/1987 | Galloway | 110/256 |
| 4,854,959 | 8/1989 | Waltert | 432/242 |
| 4,867,676 | 9/1989 | Buzetzki | 432/96 |
| 5,095,829 | 3/1992 | Nevels | 110/346 |

FOREIGN PATENT DOCUMENTS

| | | |
|---|---|---|
| 421880 | 7/1937 | Belgium . |
| 1012487 | 4/1952 | France . |
| 350590 | 4/1921 | Germany . |
| 1571365 | 7/1970 | Germany . |
| 173711 | 8/1965 | U.S.S.R. . |

*Primary Examiner*—Denise L. Ferensic
*Assistant Examiner*—Gregory A. Wilson
*Attorney, Agent, or Firm*—Darby & Darby

[57] ABSTRACT

A furnace for the thermal decomposition of solids by thermal radiation having an inlet for admitting the solids at an upper part with the solids dropping by gravity in the furnace. There is at least one heated radiator body within the furnace below the inlet to produce radiant heat energy to decompose the solids dropping in the furnace and the gases produced by the decomposition rise in the furnace to preheat the solids admitted at the inlet. The furnace also includes a heat exchanger whose liquid is heated by the decomposed solids, and there are a plurality of radiator bodies each in the form of a closed chamber with a burner to heat a plate which radiates the heat.

12 Claims, 3 Drawing Sheets

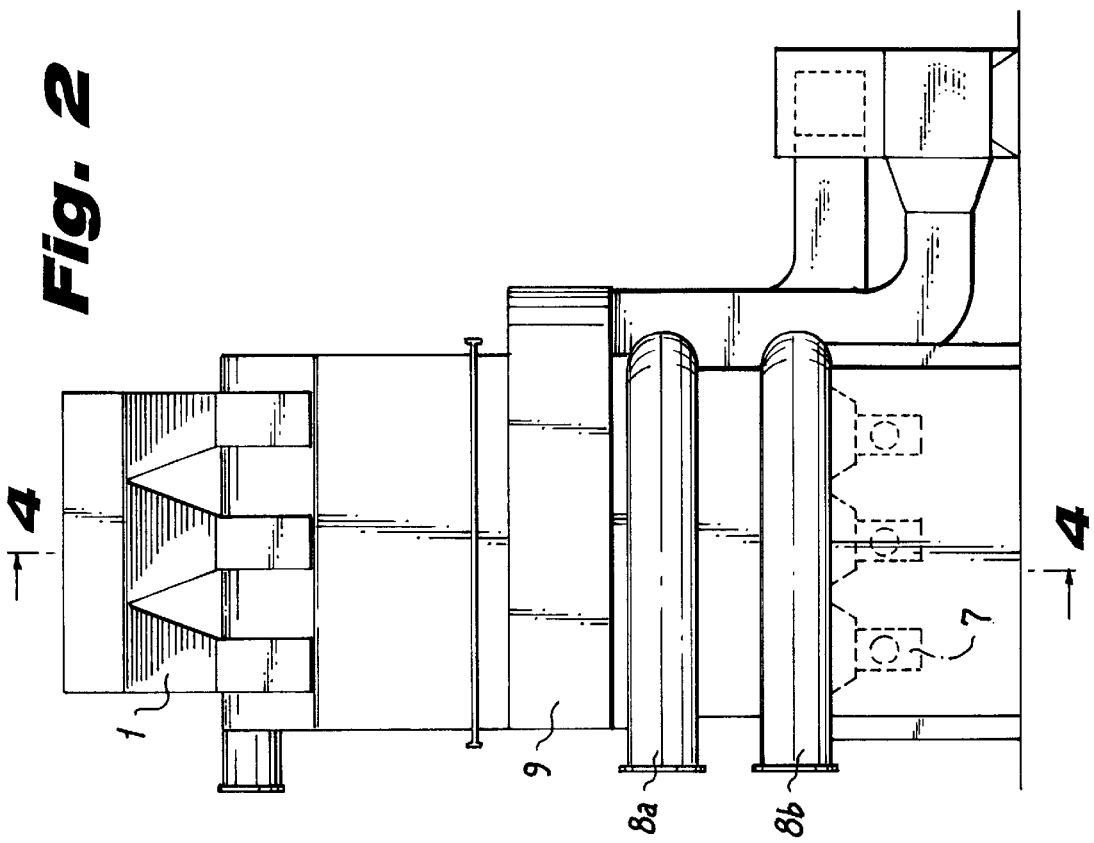
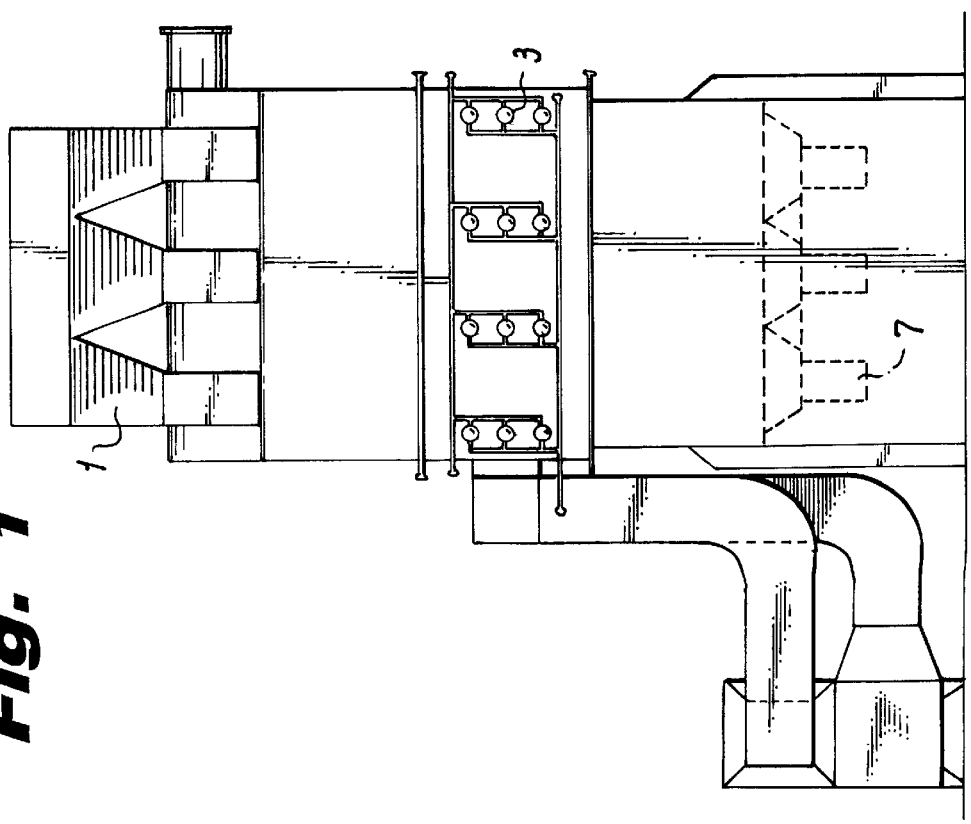

STATIC FURNACE FOR THE THERMAL DECOMPOSITION OF SOLIDS AT HIGH TEMPERATURES BY THERMAL RADIATION

TECHNICAL FIELD

The present invention refers to a static furnace, more specifically to a static furnace for the thermal decomposition of solids at high temperatures by thermal radiation.

SUMMARY OF THE INVENTION

The furnace of the present invention is characterized by the utilization of essentially thermal radiation as the source of the heat needed in the process. Hence, the direct contact with the hot gases is avoided, these hot gases being generated in the combustion of fuels in the furnace environment, also avoided is the contamination of the $CO_2$ or of the sulfur (vapor) formed in the thermal decomposition of the limestone or of the pyritic substances, and of the solid residue formed in the furnace.

The source of thermal radiation can be electric energy, combustion of fossil and/or renewable fuels, externally to the furnace environment and other forms of heating the furnace chamber by thermal radiation.

BRIEF DESCRIPTION OF THE DRAWINGS

FIG. 1 represents the front elevation of a static furnace for the thermal decomposition of solids at high temperatures by thermal radiation of the present invention.

FIG. 2 represents a back elevation of the furnace of the invention.

DISCLOSURE OF THE INVENTION

Figure 3:
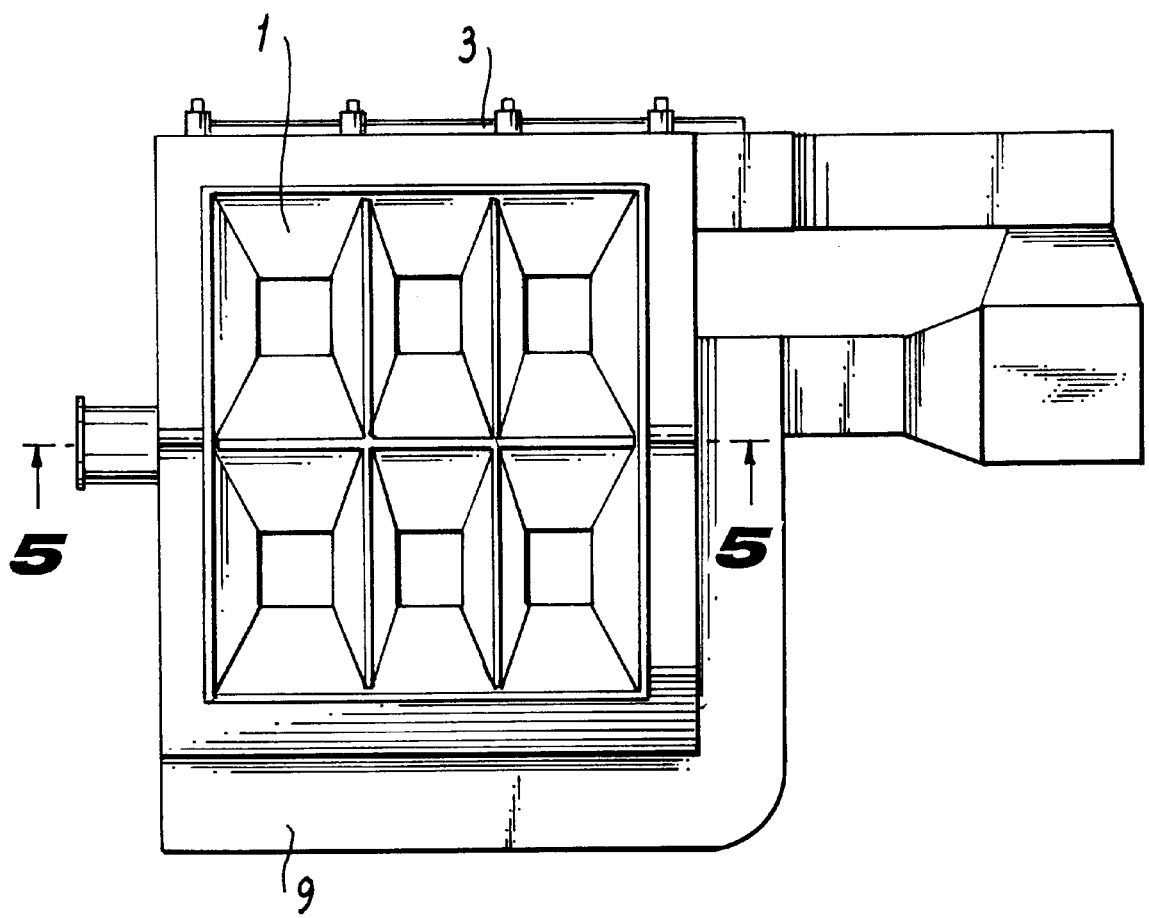
FIG. 3 a top view of the furnace of the invention.
Figure 5:
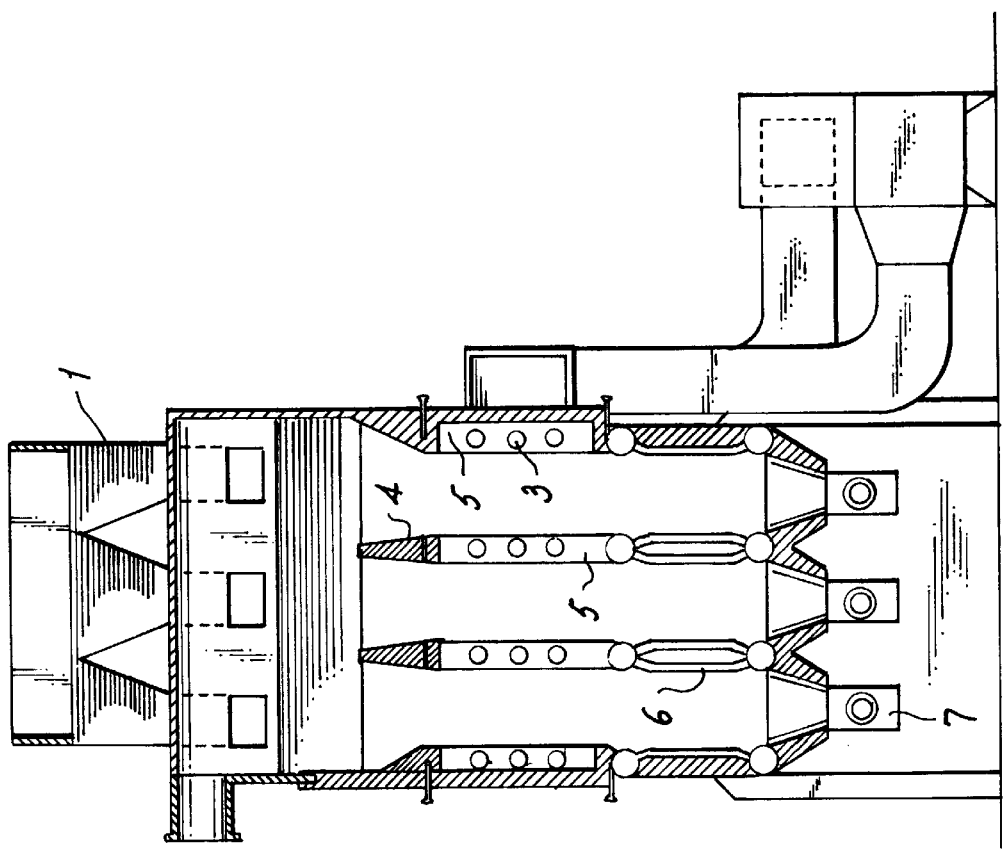
FIG. 5 represents a section according to the plane B—B in FIG. 4.
Figure 4:
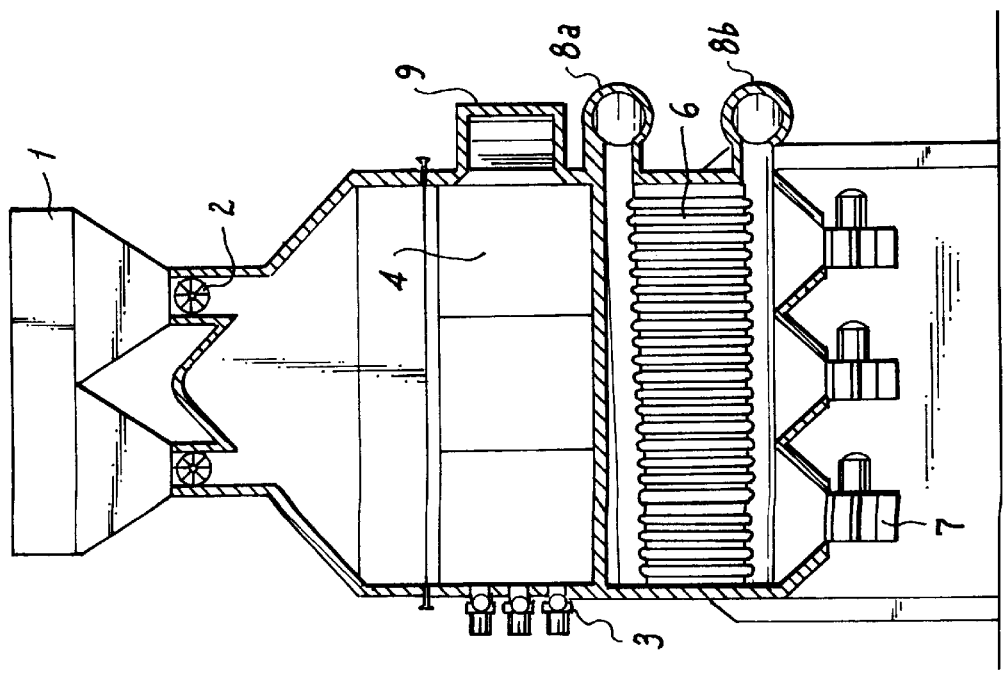
FIG. 4 represents a section according to the plane A—A in FIG. 3.

This furnace is intended for the decomposition of solids at a temperature range from 500° C. to 1200° C., for, for instance, limestone calcination ($CaCO_3$), to produce a lime (CaO) of high reactivity and pure carbonic gas ($CO_2$), at 100%, or the thermal decomposition of iron and copper pyrites, such as the pyritic rejects of coal, and the pyritic concentrates of iron and copper, to produce sulfur 100% pure and a residue of iron sulfide of industrial application.

The thermal radiation furnace, according to the present invention comprises the following main parts:

a solids feeding system;
  a solids pre-heating system which is also used in the cooling of the formed gases/vapors;
  a reactor for the thermal decomposition by thermal radiation;
  a cooling system for the solid products of the reaction and for the solids thermal energy recovery;
  a system for the discharge of the solid products; a system for the heating of the furnace to the temperatures of thermal radiation;
  a system to collect the gas/vapors formed in the reaction; and
  a system to recover the energy of the flue gases whenever this is the source of energy for the thermal radiation.

Solids Feeding System

The solids are fed through the top of the furnace and are moved in their path by gravity action until their removal from the furnace. A feeding hopper 1, silo or other means to store the solids, in the highest part of the assembly, discharges the solids through a rotating valve 2, for example, or other feeding mechanism to the furnace, which defines tightness, preventing the gases/vapors formed in the environment to escape.

Solids Pre-Heating and Gases/Vapors Cooling System

The solids are fed to the furnace at ambient temperature and they require to be heated up to the process temperature of the thermal decomposition, in the range 500° C. to 1200° C. On the other hand, the gases/vapors formed in the thermal decomposition which occurs in the reactor by thermal radiation being in the range of temperatures between 500° C. and 1200° C., must be cooled down to temperatures suitable to their recovery and utilization in the following steps.

Therefore, the solids pre-heating takes place simultaneously to the gases/vapors cooling in the upper regions of the furnace, where the solids descend by gravity and the gases/vapors rise in counter-flow and in direct contact with the solids, thus producing the desired effects.

Once heated to the desired temperature of operation, the solids enter the thermal decomposition reaction zone, which is strictly maintained at this defined temperature, rigorously controlled by the heating sources of those thermal radiation surfaces. The downflow in the reactor is caused by the gravity action. The solids remain in this reaction zone the necessary time for their complete conversion and the production of the desired products, that is, the residence time which is controlled by the solids movement by gravity through a mechanism of solids motion at the bottom of the furnace. To keep the quality or the purity of the gas/vapor formed, a slight overpressure is maintained in the furnace to prevent the contamination of the furnace atmosphere by external gases/vapors. Three reaction zones are shown in the figures. The heat to heat up the ceramic plates 4 is provided by burners 3 located in completely isolated chambers 5 from the reactions/reaction zones of the furnace to avoid the contamination of the reaction products with the combustion products of the fuel and of the excess air. The chamber walls, where the burners are installed, are vertical and the refractory plates will be heated up to transfer the heat received via combustion to the solids (limestone or pyrites, pending upon the application) by thermal radiation.

The figures present four chambers and twelve burners each chamber, as an example. The number of burners for maximum energy efficiency will be defined as function of the flame intensity, shape and temperature.

Solid Products of the Reaction Cooling System and the Solids Thermal Energy Recovery After completion of the thermal decomposition reaction, the solids in the temperature range 500° C.–1200° C. will be cooled to temperatures suitable for their handling, discharge and/or further utilization in other process steps downstream the furnace. The heat recovery from the solid products with their consequent cooling, can be made, for example, also by thermal radiation to a system of water cooled wall, to produce hot water and/or steam. Such water wall is similar to those existing in boilers in which the tubes 6 in a vertical position, united by fins or composing the waterwall, are filled up with water, from a lower water header 8b and receiving the heat of the solid products within the furnace, by thermal radiation quantity, the water is heated up and/or steam is produced which is guided then to the upper hot water or steam header 8a. In this system, the solids follow their movement downwards by the action of gravity, allowed by a mechanism, for example, rotary valves 7 actuated by low energy consumption motors at the lowest part of the furnace or by an endless screw, which at the same time, makes the sealing and tightness of the furnace against the intake of air and/or other gases to the interior of the furnace, which would contaminate the desired gases/vapors and/or solid products. Hence, the same heat transfer mechanism is used, that is, the thermal radiation, to supply the heat of reaction of thermal decomposition, in the reactor, and for the thermal energy recovery and cooling of the reaction solid products.

Another way to recover the thermal energy contained in the solids and their simultaneous cooling, can be to send the solids to an air tight compartment, a silo for example, with double sealing and send air into it, cooling the solids and heating up the air which would serve as combustion air to the fuel burners.

Discharge of Solid Products System

Once the solids are cooled, these reaction products are discharged from the furnace, by gravity, through the rotary valve 7, or endless screw, to the desired site.

Heating of the Furnace to the Thermal Radiation Temperatures System

To reach the temperatures which are needed to the conduction of the process by thermal radiation, the external source of heat to the furnace surfaces can be electric energy or any other, for example, the burning of fossil fuels or renewable energy, for example, in burners localized in compartments, adequately designed, to optimize the heating process to the walls/surfaces of the furnace. Those burners and the burning compartments must be in a sufficient number for the desired production rate, and their specification is a function of the temperature to be reached for the reaction process to take place. The utilization of the temperature and the flame radiant surface of the burners must be optimized, for the desired heating of the surfaces/walls of the furnace.

Gas Collecting/Vapor Collecting System

The gas/vapor of interest, formed in the reaction of thermal decomposition, should be recovered under conditions of their further utilization. An induction blowing system, downstream the furnace, defines the needed conditions to remove that gas/vapor. Care should be taken that the gas/vapor be at a temperature above its condensation at the exit to the furnace, or a partial condensation of one of its components, or above the dew point if it is a mixture of gases/vapors.

The gas/vapor formed, after its cooling and pre-heating of the solids before the reaction, enters a gas/vapor collector/header, at the uppermost part of the furnace, from where it is removed from the furnace. The collecting system for the gas/vapors must maintain a slight overpressure in the furnace atmosphere, to avoid its contamination with gases/vapors from outside.

Flue Gases Energy Recovery System

One of the possible external sources of heat, for heating of the surfaces/walls of the furnace to the temperature of radiation for the process, is the combustion of fossil or renewable fuels, liquid, with specially selected burners for the desired application, so that the fuel energy use will be optimized, by means of the high temperature of the flame and of its surface, and of the temperature of the flue gases.

The burners are placed in the front part of the furnace in compartments specially designed for this application, in an adequate number to reach the temperature of the surfaces/walls of the furnace, suitable to the process. The flue gases are removed for example, from the rear part of those compartments and, might be used, in conventional equipments already available in the marketplace, for the pre-heating of the necessary air to the combustion which was itself the source of these flue gases.

The electric energy as source of external heat could only find practical application in those economic situations, in which, for example, the electric energy is cheap or can be generated at the site at low costs, or even, close to the furnace.

The figures present the typical configuration of the thermal radiation furnace, in which the several parts which make it, or its systems can be easily identified. The dimensions are typical and will depend upon the process and its characteristics, such as: size of the solid particles, process temperature, external source of heat, nature of the formed products, level of the energy recovery desired, and of the nature and characteristics of the solid particles.

The flue gases produced in the combustion chambers are collected in a channel 9 in the furnace, and, after preheating of the combustion air, the gases are vented to the atmosphere.

What is claimed is:

1. A furnace for the thermal decomposition of solids by thermal radiation comprising:

an inlet for admitting the solids at an upper part of said furnace, the solids dropping by gravity into a reaction zone in the furnace;

at least one heated radiator body within said furnace below said inlet to produce radiant heat energy radiated to said reaction zone to decompose the solids dropping in the furnace, the gases produced by the decomposition rising in said furnace to preheat the solids admitted at said inlet; and a heat source external of said furnace reaction zone producing the heat to heat said radiator body to produce radiant heat energy.

2. A furnace according to claim 1 further comprising a cooling unit below said at least one radiator body to cool the decomposed solids.

3. A furnace as in claim 1 further comprising a system for collecting the gas and vapor produced by the decomposition.

4. A furnace according to claim 1 wherein said at least one radiator body comprises a closed chamber including a burner and a ceramic plate heated by said burner serving as said heat radiator body.

5. A furnace as in claim 1 wherein there are a plurality of said heat radiator bodies spaced around said furnace.

6. A furnace according to claim 5 wherein said at least one radiator body comprises a closed chamber including a burner and a ceramic plate heated by said burner serving as said heat radiator body.

7. A furnace for the thermal decomposition of solids by thermal radiation comprising:

an inlet for admitting the solids at an upper part of said furnace, the solids dropping by gravity in the furnace;

at least one heated radiator body within said furnace below said inlet to produce radiant heat energy to decompose the solids dropping in the furnace, the gases produced by the decomposition rising in said furnace to preheat the solids admitted at said inlet; and a cooling unit below said at least one radiator body which comprises a heat exchanger to collect the heat of the solids decomposed by the thermal radiation.

8. A furnace as in claim 7 wherein said heat exchanger comprises a chamber including vertically extending tubes with fins, the chamber containing a liquid that is heated to produce a hot liquid or steam.

9. A furnace for the thermal decomposition of solids by thermal radiation comprising:

an inlet for admitting the solids at an upper part of said furnace, the solids dropping by gravity in the furnace;

at least one heated radiator body within said furnace below said inlet to produce radiant heat energy to decompose the solids dropping in the furnace, the gases produced by the decomposition rising in said furnace to preheat the solids admitted at said inlet wherein said at least one radiator body comprises a closed chamber including a burner and a ceramic plate heated by said burner serving as said heat radiator body.

10. A furnace for the thermal decomposition of solids by thermal radiation comprising:

an inlet for admitting the solids at an upper part of said furnace, the solids dropping by gravity in the furnace;

at least one heated radiator body within said furnace below said inlet to produce radiant heat energy to decompose the solids dropping in the furnace, the gases produced by the decomposition rising in said furnace to preheat the solids admitted at said inlet, wherein said at least one radiator body includes a plate extending substantially vertically in said furnace for radiating heat, the solids dropping in said furnace passing by said plate being heated by thermal radiation.

11. A furnace as in claim 10 wherein there are a plurality of said heat radiator bodies spaced apart in said furnace.

12. A furnace as in claim 10 wherein each said radiator body comprises a chamber with at least one burner for heating said plate.

* * * * *